United States Patent [19]

Scura

[11] Patent Number: 5,982,586
[45] Date of Patent: Nov. 9, 1999

[54] COMPACT HARD DISK DRIVE HEAD POSITIONER LATCH

[75] Inventor: John E. Scura, Thousand Oaks, Calif.

[73] Assignee: Micropolis (S), Pte., Ltd., Chatsworth, Calif.

[21] Appl. No.: 08/873,269

[22] Filed: Jun. 11, 1997

[51] Int. Cl.⁶ ..................................................... G11B 5/54
[52] U.S. Cl. .......................................................... 360/105
[58] Field of Search ..................................... 360/104–106

[56] References Cited

U.S. PATENT DOCUMENTS 5,523,910   6/1996   Von Alten ................................. 360/105

*Primary Examiner*—Allen T. Cao
*Attorney, Agent, or Firm*—Coudert Brothers

[57] ABSTRACT

A new and improved latching method and assembly for positively latching a positioner carrying a read/write head of a hard disk drive in a drive landing zone during non-power conditions. The assembly includes a vertically movable latching pin which is movable along a rectilinear path of travel into and out of the horizontal path of travel of the positioner carrying the drive unit read/write head. A retention spring mounted to a support column in proximity to the landing zone engages one of two grooves disposed in the latching pin to secure the pin in a latched position or in an unlatched position. The positioner impacts the retention spring to disengage it from an associated groove on the latch pin at appropriate times so bias exerted thereon by a thermal spring will move the latch pin in a desired direction. In this regard, as the thermal spring heats, it pulls the latch pin away from the latched position and, as it cools, it urges the pin back towards the latched position.

20 Claims, 3 Drawing Sheets

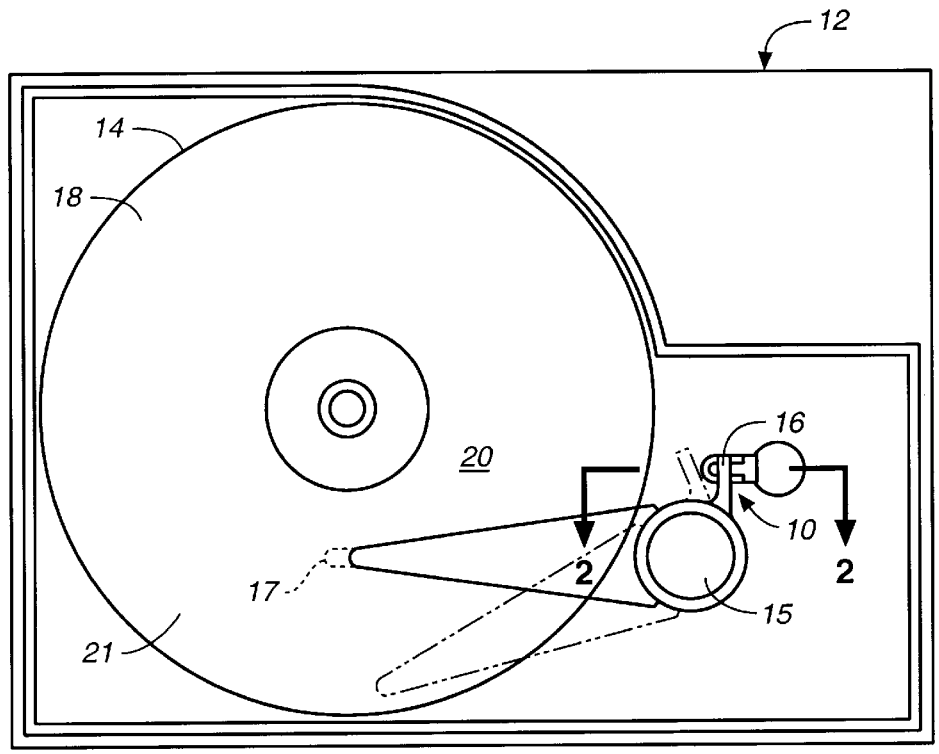
FIG._1
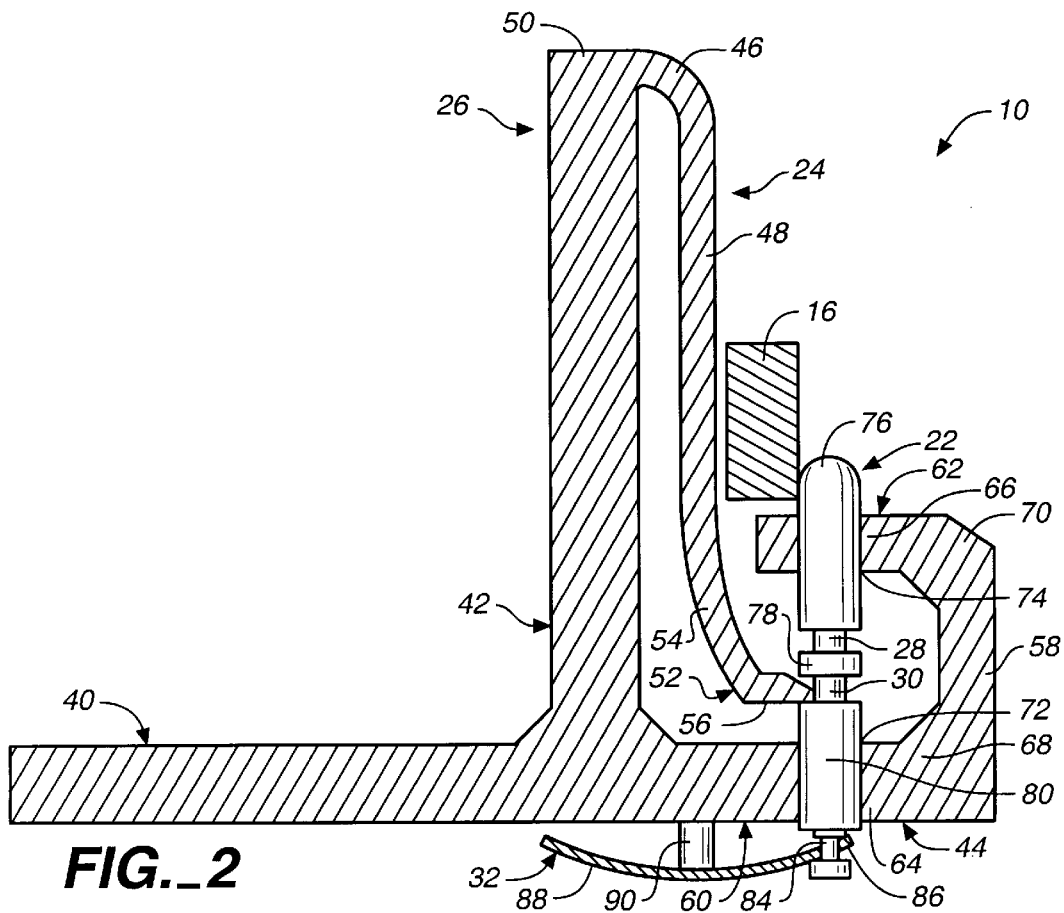
FIG._2

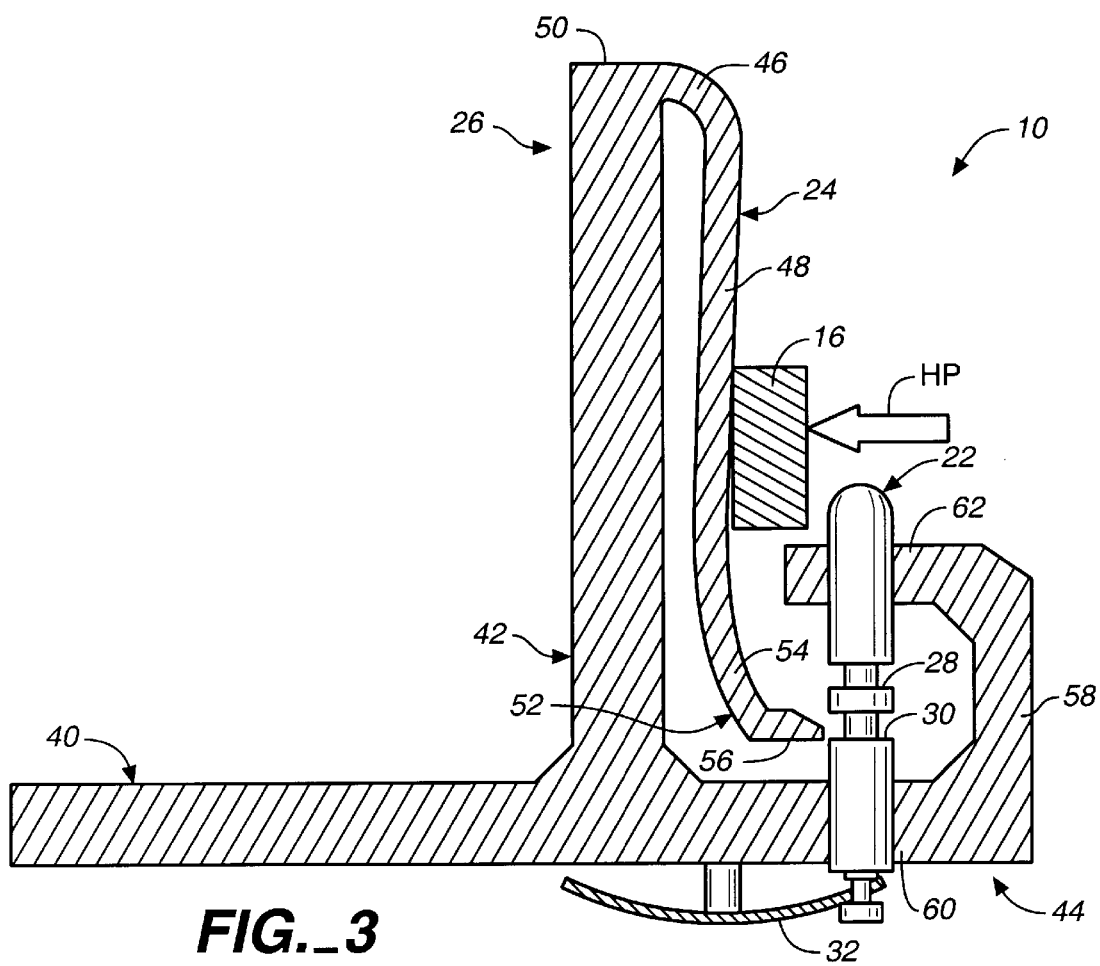
FIG._3

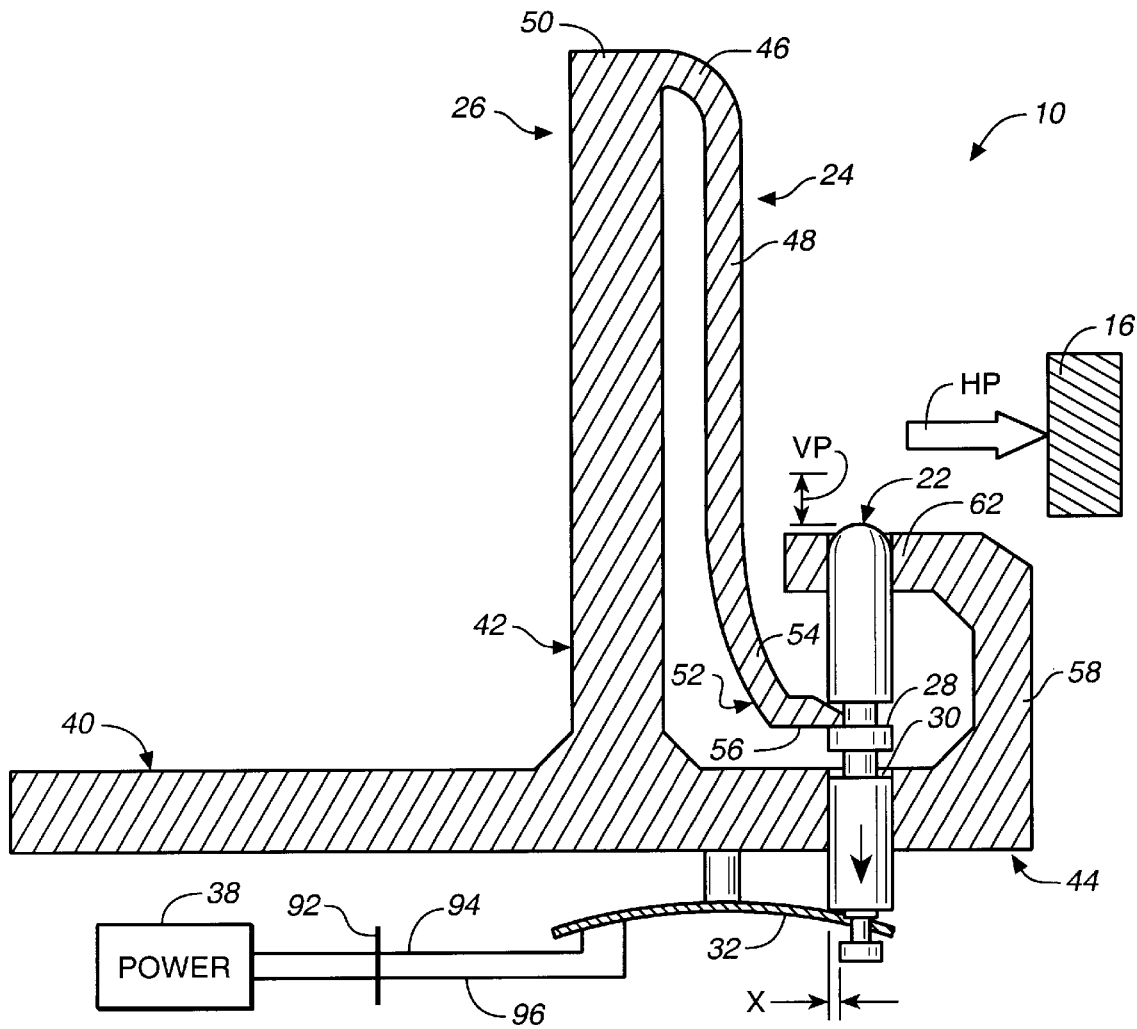
FIG._4
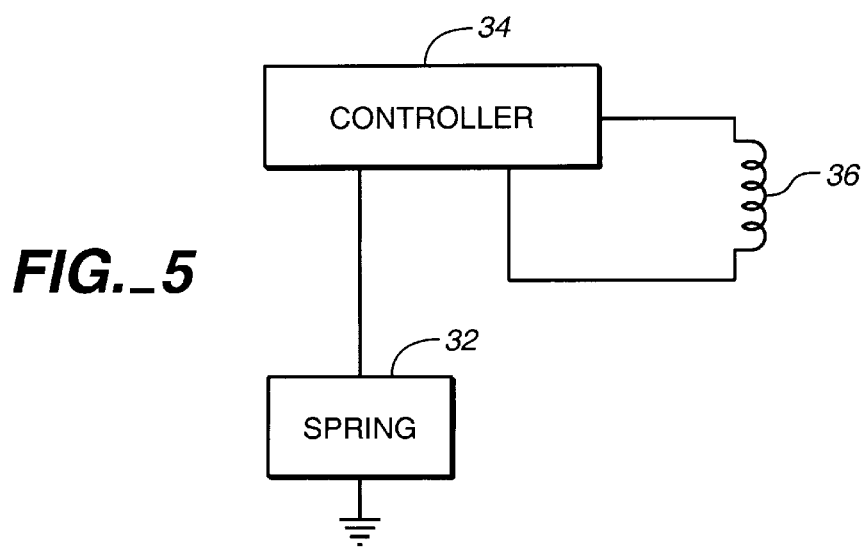
FIG._5

COMPACT HARD DISK DRIVE HEAD POSITIONER LATCH

TECHNICAL FIELD

This invention relates in general to an improved latching assembly and a method of using it. The invention more particularly relates to a hard disk drive head latching assembly and method of using the assembly to secure a drive head during a power off condition.

BACKGROUND ART

There have been many types and kinds of locking or latching mechanisms and assemblies for locking or latching a hard disk drive read/write head in a secured landing zone position. For example reference may be made to the following U.S. Pat. Nos. 4,807,072; 4,903,157; 4,989,108; 5,012,371; 5,019,932; and 5,162,959.

As disclosed in the foregoing mentioned patents, in a Winchester type disk drive, a positioner carries a read/write head above the magnetic material coated surface of a disk. The positioner is rotated by an actuator mounted to the chassis of the disk drive. The actuator locates the positioner in response to an address signal so that the heads become properly located along an addressed track within the data zone of the disk.

While the disk drive is in operation, the read/write heads normally "fly" above the surface of the disks, very close to the disks.

When the disk drive is shut down, it is desirable to move the positioner to a position which causes the heads to be removed from the data zone to a landing zone to avoid loss of data and possible damage to the system which may occur if the heads engage the storage area of the disk. This removal of the heads to the landing zone is widely known in the art as "parking" the heads. Once the heads are parked, it is desirable to latch the positioner in its parked position. With the positioner latched in the parked position, the positioner is unable to stray back into the data zone in the event of an unintentional shock and vibration acting upon the disk drive. Such unintentional shock or vibration may come from the casual moving of the disk drive or equipment containing the disk drive.

To latch the positioner in the parked position, a solenoid activated lock may be provided for engaging ether of the positioner or actuator. For example, in U.S. Pat. No. 4,807, 072 (hereinafter "the '072 patent"), a head positioner control mechanism with a head locking mechanism for a magnetic disk drive is disclosed. The transducer head is locked by a locking lever which pivots in a plane parallel to the disk plane for movement into and out of locking engagement with a latching member jointly rotatable with the head arm positioner. A solenoid holds the locking lever out of engagement with the latching member during data transfer between the disk and head. Upon completion of data transfer or when power is removed from the disk drive, the solenoid becomes de-energized thereby permitting the locking lever to be sprung into locking engagement with the latching member. Since the latching member is jointly rotatable with the head positioner, the positioner is locked in place.

A disadvantage and limitation of the device disclosed in the '072 patent is that during operation of the disk drive, an electrical current needs to be continuously applied to the locking solenoid to keep the locking lever retracted. A loss of this current during normal disk drive operation can cause unwanted and undesired interaction of the locking lever with the latch arm which may result in catastrophic failure of the disk drive. This current also generates heat in the solenoid windings which may over a period of time, cause failure of the solenoid. Furthermore, the holding current during operation of the solenoid increases power requirements for the disk drive and heat generation within the disk drive housing.

Therefore it would be highly desirable to have a new and improved latching assembly that does not require the continuous application of an electrical current for maintaining an unlatched condition to facilitate free head movement during normal power on conditions.

One attempt to overcome the disadvantages and limitations of the device described in the '072 patent are specifically addressed by the electromechanical latch described in U.S. Pat. No. 4,989,108 (hereinafter "the '108 patent"). The latch described in the '108 patent is of the type where the latching member is removed from its latching position upon a current being applied to the electromechanical latch and wherein the latch remains removed from the latching position when the current is removed.

More particularly, the electromechanical latch described in the '108 patent includes a solenoid having an armature moveable from a normally biased first position to a second position in response to an electrical current being applied to the solenoid, and means for holding the armature in the second position to allow subsequent removal of the current from the solenoid. When the armature is in its first position, it is adapted for latching the positioner in a parked position. The armature is not interactive with the positioner when its in its second position. The electromechanical latch further includes means for releasing the holding of the armature in response to the positioner returning to its parked position where the armature returns to its normally biased first position to latch the positioner.

Thus, the device of the '108 patent advanced the state of the art from that disclosed in the '072 patent in that the current need be applied to the solenoid only for moving the armature to its second position to release the positioner. Once in the second position, the armature is held mechanically. This advance in the state of the art then allowed the current to be removed from the solenoid with the holding means holding the armature in a position which is noninteractive with the positioner during normal operation of the disk drive.

While such a latching mechanism may have been fine for certain applications, it would be highly desirable to have a new an improved latching mechanism and assembly that draws current during the latching state and that does not require large bulky solenoids for effecting latching operations.

In some prior art devices in which a current releases the lock and a mechanical hold feature allows removal of the current, the positioner may need to have slight over travel to trigger a hook mechanism which capture the positioner it its parked position. This over travel may cause some of the data zone to be wasted for use in conjunction with the over travel. Should the positioner fail to over travel, the hook mechanism will not engage the latch arm, and the positioner will not be locked. Furthermore, to disengage the positioner, a disengage current sufficient to overcome the magnetic attraction between the core and the armature at a specified range of voltages would be required. It is possible that a latch may be "sticky" and not respond to the disengage current.

Therefore it would be highly desirable to have an new and improved latching mechanism and assembly that overcome the disadvantages and limitations of the prior art as hereinabove enumerated. Such a new and improved latching mechanism should be highly reliable and relatively inexpensive to manufacture.

DISCLOSURE OF INVENTION

Therefore the principal object of the present invention is to provide a new and improved latching method and assembly for positively latching a positioner carrying a read/write head of a hard disk drive in a drive landing zone during non-power conditions.

It is another object of the present invention to provide such a new and improved latching assembly which does not require a disengage current to engage the positioner.

It is another object of the present invention to provide such a new and improved latching assembly which does not require over travel of the positioner to engage a hook mechanism so the positioner may be locked in the parked position.

It is another object of the present invention to provide such a new and improved latching assembly that is highly reliable and relatively inexpensive to manufacture.

Briefly, the above and further objects of the present invention are realized by providing a new and improved drive head latching assembly and method of securing a drive head during non power conditions. The latching assembly has the features of providing for positive engagement of the positioner to prevent the read/write head from engaging the surface of the storage disk when the power is turned off.

According to the present invention, a drive head latching assembly secures the disk drive positioner in the parked position after shut down. The assembly includes a vertically movable latching pin which is movable along a rectilinear path of travel into and out of the horizontal path of travel of the positioner carrying the drive unit read/write head. A retention spring mounted to a support column in proximity to the landing zone engages one of two grooves disposed in the latching pin to secure the pin in a latched position or in an unlatched position. The positioner impacts the retention spring to disengage it from an associated groove on the latch pin at appropriate times so bias exerted thereon by a thermal spring will move the latch pin in a desired direction. In this regard, as the thermal spring heats, it pulls the latch pin away from the latched position and, as it cools, it urges the pin back towards the latched position.

In operation, the positioner is latched when no power is supplied to the drive unit. When power is applied to the drive unit a bias current is applied to the actuator voice coil in a direction which forces the positioner against the horizontal retention spring. When the positioner presses against the retention spring, the spring disengages itself with the latch pin allowing unobstructed movement of the latch pin. Current is then applied to the thermal spring and as it heats the latching pin is pulled away is aligned with the retention spring at an unlatched pin groove location. A bias current is then applied to the actuator voice coil in a direction which forces the positioner way from the horizontal retention spring. The horizontal retention spring now moves back towards the latch pin and engages a pin groove thereon. Current is now removed from the thermal spring resulting in a restoration force against the latch pin in the vertical direction. The pin however, cannot move since the horizontal retention spring is engaged into the unlatched pin groove position. As the latch pin is no longer disposed in the horizontal path of travel of the positioner, the positioner is free to move into the data zone of the disk unit. When power is removed from the drive, energy stored in the rotating disk pack and spindle is diverted into the actuator voice coil in a polarity which forces the positioner against the horizontal retention spring. The horizontal retention spring is forced out of the unlatched pin groove position by the incoming positioner. The latch pin is now free to move. The latching pin moves in the positive vertical direction. by the force from the thermal spring, and into the path of the positioner trapping it between the latch pin and the support column. As the power from the rotating disk pack/spindle dissipates the force exerted against the horizontal retention spring from the positioner diminishes, and the horizontal retention spring moves into the latched pin groove position. In this manner the positioner is secured into the desired landing zone area.

BRIEF DESCRIPTION OF DRAWINGS

FIG. 1 is a plan view of a drive head latching assembly which is constructed in accordance with the present invention, illustrating its installation in a disk drive;

FIG. 2 is a cross sectional side elevational view of the drive head latching assembly of FIG. 1 taken substantially on line 2—2, illustrating the assembly in a locked position, FIG. 3 is a cross sectional side elevational view of the drive head latching assembly of FIG. 1 taken substantially on line 2—2, illustrating the assembly in an unlatched position;

FIG. 4 is a cross sectional side elevational view of the drive head latching assembly of FIG. 1 taken substantially on line 2—2, illustrating the assembly in a latched and unlocked position; and FIG. 5 is a block diagram of the control circuit for moving the latching mechanism of FIG. 1 between open and close positions.

DESCRIPTION OF AN EXEMPLARY PREFERRED EMBODIMENT

Referring now to the drawings and more particularly to FIG. 1, there is shown a drive head latching assembly 10, which is constructed in accordance with the principles of the present invention, and which is illustrated in an installed position in a conventional disk drive unit 12.

The disk drive unit 12 is conventional in construction and includes a rotatable data storage medium or disk 14 having an actuator 15 that locates a positioner arm 16 carrying a read/write head 17 to a desired addressable location above the surface of the disk 14 during normal read/write operations. The drive head latching assembly 10 has the feature of providing for positive engagement of the positioner arm 16 to prevent the read/write head from engaging the data storage surface area of the disk 14 when power to the disk drive unit 12 has been removed. In this regard, it is well known to those skilled in the art that the disk 14 has a magnetic medium which is divided into a data zone 18 and a landing zone 20, where the data zone 18 includes a plurality of sectors and tracks for the storage of addressable data. The landing zone 20 on the other hand is not utilized for the storage of such addressable data, but instead is an area designated for the read/write head 17 to come to rest upon when the disk drive unit 12 is shut down. In this manner, the data stored within the data zone 18, will not be lost by the read/write head 17 making contact with the magnetic storage medium on the disk surface 21 as during normal shut down operations, as the actuator 15 locates the positioner 16 to a "parked" position with the read/write head over the landing zone 20.

As will be described hereinafter in greater detail, once the actuator 15 has located the positioner 16 to its parked position, the drive head latching assembly 10 will positively engage the positioner 16 so that the actuator 15 is unable to move the positioner 16 until power has been restored to the disk drive unit 12. The latching assembly 10 is a positive mechanism as the force required to overcome the latching force is much greater than the force exerted by the positioner 16.

Considering now the drive head latching assembly 10 in greater detail with reference to FIGS. 1–5, the drive head latching assembly 10 generally comprises a vertically movable latching pin 22 which is movable along a rectilinear vertical path of travel (VP) into and out of the horizontal path of travel (HP) of the positioner 16. A retention spring 24 mounted to a support column 26 in proximity to the disk 14, engages one of two detents or grooves 28 and 30 on the latching pin 22 to secure it in either a latched parked position as illustrated in FIG. 2, a latched flying position as illustrated in FIG. 4, or in an unlatched actuating position as illustrated in FIG. 3. When the pin 22 is unlatched, a bias exerted on the pin 22 by a thermal spring 32 moves the pin 22 along the rectilinear path of travel (P) in a desired direction to permit the pin 22 to be latched in either the latched parked position or the latch flying position. In this regard, in order to clarify the different operating positions, the groove 28 is called an unlatched pin groove 28 while the groove 30 is called a latched pin groove 30.

A controller 34 (FIG. 5) responds to shut down and power up conditions to actuate an actuator voice coil 36 to cause the actuator 15 to move the positioner 16 into and out of engagement with the retention spring 24 as will be described hereinafter in greater detail.

In operation, the positioner 16 is latched in the parked position when no power is supplied to the drive unit 14. When power is applied to the drive unit 14, the controller 34 causes a bias current to be applied to the actuator voice coil 36. The actuator coil 36 in turn, causes the actuator 15 to move the positioner 16 into engagement with the retention spring 24 with a sufficient pressing force to disengage the retention spring 24 from its latching position with the pin 22 to permit unobstructed movement of the pin 22. When the spring 24 is disengaged from the pin 22, the controller 34 causes a constant current source 38 to apply electrical current to the thermal spring 32 to thermally flex the spring 32 into a convex configuration to move the pin 22 along its rectilinear path of travel (P) from a parked position as illustrated in FIG. 2 to a flying position as illustrated in FIG. 4. A bias current is then applied to the coil 36, the position 16 moves away from the retention spring 24 allowing the spring 24 to move into engagement with the unlatched pin groove 28 as illustrated in FIG. 4. The controller 34 now removes the current from the thermal spring 32 allowing the spring 32 to cool, resulting in a restoration force against the pin 22 in the positive vertical direction. The pin 22 however, can not move since the retention spring 24 is engaged in the unlatched pin groove 28. In this manner, the positioner 16 is free to move unobstructed from the latch pin 22.

When power is removed from the drive unit 12, the kinetic energy stored by the rotating disk 14 is directed to the actuator coil 36 for a predetermined period of time and in a polarity which forces the positioner 16 into the landing zone 20 and positive engagement with the retention spring 24. The retention spring 24 is moved horizontally, under the force of the positioner 16, a sufficient distance to force the retention spring 24 out of the path of travel followed by the latch pin 22 and more specifically out of the unlatched pin groove 28, which frees the pin 22 for vertical movement.

As the thermal spring has no applied power, the thermal spring 32 moves the pin 22 in the positive or upward vertical direction and into the horizontal path traveled by the positioner 16, trapping the positioner 16 between the pin 22 and the support column 26.

As the kinetic energy of the rotating disk 14 continues to dissipate through continued rotation, the driving force exerted by the coil 34 diminishes allowing the tension against the retention spring 24 to be released. In this manner, at the end of the above-mentioned predetermined period of time, the retention spring 24 moves into the latched pin groove 30 and then, thus positioner 16 is secured in the desired landing zone area.

Considering now the support column 26 in greater detail with reference to FIG. 2, the support column 26 generally includes a base plate 40 having integrally connected thereto an upstanding wall member 42 and a laterally projecting pin guide member 44. The wall member 42 extends perpendicularly upwardly from the base plate 40 a sufficient distance to help position the retention spring 24 in proper orientation for engagement with the positioner 16 and the latch pin 22.

The retention spring 24 has a unitary construction and is generally irregular in shape having a top leg member 46 that is connected to a distal end portion 50 of the wall member 42. The top leg member 46 has an inverted semi-U shaped configuration and projects outwardly from the wall member 42 for supporting from above an integrally connected intermediate leg member 48 having a generally straight configuration. The intermediate leg member 48 is spaced apart from and substantially parallel to the wall 42. The intermediate leg member 48 is disposed in the horizontal path of travel (HP) followed by the positioner 16 as it is moved by the actuator 15 to the parked position above the landing zone.

In order to latch the pin 22 in a fixed position, the retention spring 24 includes a bottom leg member 52. The bottom leg member 52 includes an upper outwardly curved portion 54 that is integrally connected to the distal end of the intermediate leg member 48 and a lower laterally projecting pin engaging portion 56 that is substantially parallel to the base plate 40.

The proximal end of the pin engaging portion 56 is integrally connected to the distal end of the curved portion 54 and has a height (H) that is substantially greater than the height ($h_1$) of the respective ones of the groves 28 and 30. The distal end of the pin engaging portion 56 is wedge shaped and has a distal end height (h) that is substantially less than the $h_1$ height of the respective ones of the grooves 28 and 30. With such a configuration, the pin engaging portion 56 is positively received within one of the grooves when the retention spring 24 is in a non compressed position as illustrated in FIGS. 2 and 4 respectively.

Considering now the pin guide member 44 in greater detail with reference to FIGS. 2–4, the pin guide member 44 has a general U-shape that includes a generally straight upstanding leg member 58 which is integrally connected between a pair of parallel spaced apart guiding members 60 and 62 respectively. The distal end of member 60 is integrally connected to the base plate 40 for facilitating the alignment of the pin 22 with the retention spring 24.

Each of the guiding members 60 and 62 have a straight leg portion, such as a straight leg portion 64 and 66 respectively and a bent portion, such as a bent portion 68 and 70 respectively. Each of the straight portions 64 and 66 include a pin guide hole, such as a pin guide hole 72 and a pin guide hole 74. The pin guide holes 72 and 74 are aligned along their respective longitudinal axes and are dimensioned for receiving in a non friction tight fit the pin 22 for free unobstructed rectilinear movement.

Considering now the latch pin 22 in greater detail with reference to FIGS. 2–4, the latch pin 22 has a unitary construction and is generally cylindrical in shape. In this regard, the pin 22 includes a top portion 76, and intermediate portion 78 and a bottom portion 80. The intermediate portion 78 is disposed between the grooves 28 and 30 respectively. The distal end of the bottom portion 80 is recessed and includes a spring receiving aperture 84 which is dimensioned for receiving therein in a friction tight fit an end portion 86 of the thermal spring 32.

The end portion 86 of the thermal spring 32 supports from below the pin 22 in one of two position when the spring 32 is thermally flexed. In this regard, as the spring 32 flexes into a concave configuration as best seen in FIG. 2, the pin 22 is moved upwardly a sufficient distance to position the top portion 76 of the pin 22 in the horizontal path of the positioner 16 to positively restrain the positioner 16 when it has been positioned to its parked position by the actuator 15.

When the spring 32 flexes into a convex configuration as best seen in FIG. 4, the pin 22 is moved downwardly a sufficient distance to retract the distal end of the pin 22 into the pin guide hole 74 permitting the positioner 16 free unobstructed lateral or horizontal movement between the data zone area 18 and the landing zone area 20 under the control of the actuator 15.

As best seen in FIGS. 2–4, the thermal spring 32 includes a flexible arm portion 88 and a centrally disposed upwardly projecting connecting pin 90 which is attached at its distal end to the base plate 40 via a pin receiving electrical socket which is illustrated diagramatically at 92 (FIG. 4) mounted within the base pate 40. The pin 90 is positioned at a predetermined distance (D) from the guide hole 72 to enable the distal end 86 of the thermal spring 32 to be received within the aperture 84. As best seen in FIG. 4, a pair of electrical conductors 94 and 96 pass through the pin 22 and are electrically connected via the socket 92 to the current power source 38 which thermally heats the spring 32 under control of the controller 34.

FIG. 4 illustrates the power source 38 and the electrical conductors 94 and 96 as being connected at the other distal end of the spring 33. This connection arrangement is for illustration purposes only to clarify that the pin 22 is received in the socket 92 and that the conductors 94 and 96 carry the electrical current to the spring 32. Those skilled in the art therefore will understand the electrical connection to the spring arm 88 is via the electrical conductors 94 and 96 respectively which are disposed within the connecting pin 90 and not at the distal end of the spring 32.

While a particular embodiment of the present invention has been disclosed, it is to be understood that various modifications are possible and are contemplated within the true spirit and scope of the appended claims.

For example, instead of a cylindrically shaped latch pin with grooves, a rectangularly shaped shaft with detent holes or slots may be employed.

There is no intention, therefore, of limitations to the exact abstract or disclosure herein presented.

I claim:

1. A method of positively securing a disk drive unit positioner, comprising:
   providing a latch having a latch detent and an unlatched detent;
   providing a retention spring having one portion disposed in a path of travel followed by the positioner and another portion in another path of travel followed by said latch;
   coupling a thermal spring to said latch;
   applying power to move the disk drive unit positioner into positive engagement with said retention spring to cause the positioner to move out of the path of travel followed by said latch;
   applying a current to said thermal spring to cause said latch to move out of the path of travel followed by the positioner as the positioner moves from a landing zone position to a data zone position;
   moving the positioner away from said retention spring to cause the positioner to move into the path of travel followed by said latch and to engage an unlatched detent; and
   removing said current from said thermal spring to apply a restoration force against said latch in a positive vertical direction;
   said latch remaining in an unlatched position due to the horizontal force applied by the retention spring to the unlatched detent.

2. A method according to claim 1, further comprising;
   removing power;
   diverting the dissipating energy stored in a rotating disk to an actuator coil to sufficiently energize the actuator coil to move the positioner from the data zone into the landing zone and into positive engagement with the retention spring;
   responding to the positive engagement of the positioner with the retention spring by moving the retention spring out of the unlatched detent;
   moving the latch vertically upwardly under the force of the thermal spring;
   de-energizing said actuator coil to move the positioner from positive engagement with said retention spring; and
   responding to the positioner moving away from said retention spring, by moving the retention spring into the latched detent.

3. A drive head latching assembly to secure a disk drive unit positioner, comprising:
   a base plate having an integrally connected upstanding wall member extending perpendicularly upwardly therefrom and an integrally connected latch pin guide member extending laterally therefrom;
   a thermal spring supported from above by said base plate for flexing between a concave configuration and a convex configuration in response to a move latch pin signal;
   a latch pin coupled to said thermal spring and supported within said latch pin guide member for moving in a rectilinear path of travel to block positively the positioner when the positioner is disposed within a landing zone area;
   said latch pin including a latch pin detent and an unlatched pin detent for facilitating latching said latch pin in a fixed position so that said latch pin does not respond to said thermal spring when said thermal spring flexes between the concave configuration and the convex configuration; and
   a retention spring connected to said upstanding wall member for engaging the positioner when the positioner moves to a landing zone to facilitate unobstructed movement of the latch pin between latched and unlatched positions and for engaging the latch pin detent when the positioner is disposed in said landing zone area and for engaging the unlatched pin detent when the positioner is disposed in a data zone area.

4. A drive head latching assembly according to claim 3, further comprising:
a controller for causing a current source to be supplied to said thermal spring when the positioner engages said retention spring and for causing said positioner to move into engagement with said retention spring when power is applied to said controller.

5. A drive head latching assembly according to claim 3, wherein said thermal spring includes:
a flexible arm member having one of its distal ends coupled to said latch pin for moving the latch pin in response to said move latch pin signal; and
a support member connected between said base plate and said arm member for supporting from above said flexible arm member and for coupling a source of electrical current to said flexible arm member.

6. A drive head latching assembly according to claim 3, wherein said latch pin guide member has a unitary construction and is generally U-shaped.

7. A drive head latching assembly to secure a disk drive unit positioner, comprising:
a support column;
a thermal spring on said support column for flexing between up and down positions in response to an electrical signal;
a latch pin coupled to said thermal spring for moving in a rectilinear path of travel with respect to said support column to lock and restrain the positioner when said thermal spring is in one of the up and down positions of said rectilinear path and to permit unobstructed positioner movement when said spring is in the other one of the up and down positions.

8. A drive head latching assembly according to claim 7, further comprising:
a latch pin guide member for helping to guide said latch pin into a path of travel followed by the positioner as it moves between a data zone position and a landing zone position.

9. A drive head latching assembly according to claim 8, wherein said thermal spring is supported from above by said latch pin guide member to facilitate coupling said thermal spring to said latch pin.

10. A drive head latching assembly according to claim 8, wherein said latch pin guide member includes:
a base plate having an integrally connected upstanding wall for helping to support said thermal spring to facilitate the rectilinear movement of said latch pin into and out of the path of travel followed by the positioner.

11. A drive head latching assembly according to claim 10, wherein said latch pin includes a latched pin detent and an unlatched pin detent for facilitating latching said latch pin in a parked position when said spring is in one of the up and down positions and for facilitating latching said latch pin in a flying position when said spring is in the other one of the up and down positions.

12. A drive head assembly according to claim 11, further comprising:
a retention spring mounted at a distal end of said upstanding wall and extending outwardly therefrom to be partially disposed in a horizontal path of travel followed by the positioner and partially disposed in a vertical path of travel followed by said latch pin.

13. A drive head latching assembly according to claim 12, further comprising:

a controller for generating control signals to cause positioner movement and for applying a source of electrical current to said thermal spring.

14. A drive head latching assembly according to claim 13, further comprising:
an actuator coil responsive to said controller for causing said positioner to move into positive engagement with said retention spring for a predetermined period of time when there is a power shut down condition; and
said actuator coil not moving said positioner into positive engagement with said retention spring after said predetermined period of time to permit said retention spring to return to a biased state positively engaging said latched detent.

15. A drive head latching assembly according to claim 14, wherein said thermal spring includes:
a flexible spring arm coupled to said latch pin to cause said latch pin's vertical movement; and
a support arm for facilitating the conducting of electrical current to said spring arm to cause said spring arm to flex.

16. A drive head latching assembly according to claim 15, wherein said retention spring includes:
an upper leg member connected to the distal end of the upstanding wall;
an intermediate leg member integrally connected at said intermediate leg member's proximal end to said upper leg member and extending parallel and spaced apart from said wall member; and
a bottom leg member integrally connected at said bottom leg member's proximal end to a distal end of said upper leg member and having a distal end portion for engaging said latch pin.

17. A drive head latching assembly according to claim 16, wherein said distal end portion of the bottom leg member is wedge shaped.

18. A drive head latching assembly according to claim 8, wherein said latch pin guide member is generally U-shaped having a pair of spaced apart substantially parallel straight leg members integrally connected by an intermediate leg member disposed in a vertical orientation;
each of said straight leg members including a latch pin receiving hole for helping to guide said latch pin in a desired path of travel.

19. A drive head latching assembly according to claim 11, further comprising:
a retention spring mounted at about a distal end of said upstanding wall and projecting outwardly therefrom a sufficient distance to be engaged by the positioner when the positioner is disposed in said landing zone portion and to engage the latched pin detent when the thermal spring is in one of the concave and convex configurations and said retention spring is not engaged by the positioner and to engage the unlatched pin detent when the thermal spring is in the other one of the concave and convex configurations and said retention spring is not engaged by the positioner.

20. In combination with a disk drive system including an actuator, a positioner, and a disk having a landing zone area and a data zone area, a disk drive head latching assembly comprising:
a base plate;
a latch pin supported by said plate having a latch pin detent and an unlatched pin detent;
a retention spring mounted to said base plate and having one portion disposed in a horizontal path of travel followed by the positioner and another portion disposed in a vertical path of travel followed by said latch pin;

a thermal spring mounted to said base plate and coupled to said latch pin for moving said latch pin along said vertical path of travel when said retention spring is not in positive engagement with the positioner;

said retention spring engaging said latch pin detent when no power is applied to the disk drive system to secure said latch pin a parked position preventing the positioner from moving into the data zone area;

said retention spring engaging said unlatched pin detent when power is applied to the disk drive system to secure said latch pin in a flying position to enable said latch pin to move under the force of the thermal spring when the thermal spring is not carrying current and said retention spring is not engaged positively by the positioner; and an actuator coil for receiving diverted stored energy from the disk as the disk drive system powers down;

said actuator coil causing the positioner to move into the landing zone area and into positive engagement with said retention spring for a predetermined period of time to release said retention spring from engagement with said latch pin detent and to permit said latch pin to move along said latch pin's vertical path of travel to block the positioner from entering the data zone when no power is applied to the disk drive unit;

said positioner moving away from positive engagement with said retention spring after said predetermined period of time to permit said retention spring to move into engagements with said latch pin when no power is applied to the disk drive unit.

* * * * *